US010810737B2

United States Patent
Amit et al.

(10) Patent No.: US 10,810,737 B2
(45) Date of Patent: Oct. 20, 2020

(54) AUTOMATED NIPPLE DETECTION IN MAMMOGRAPHY

(71) Applicant: International Business Machines Corporation, Armonk, NY (US)

(72) Inventors: Guy Amit, Ganei Tikva (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 16/163,590

(22) Filed: Oct. 18, 2018

(65) Prior Publication Data

US 2020/0126228 A1 Apr. 23, 2020

(51) Int. Cl.
*G06K 9/00* (2006.01)
*G06T 7/00* (2017.01)
*G06T 7/62* (2017.01)
*G06T 7/73* (2017.01)

(52) U.S. Cl.
CPC .............. *G06T 7/0014* (2013.01); *G06T 7/62* (2017.01); *G06T 7/74* (2017.01); *G06T 2207/10116* (2013.01); *G06T 2207/30068* (2013.01)

(58) Field of Classification Search
CPC . G06T 2207/10116; G06T 2207/30068; G06T 7/0014; G06T 7/62; G06T 7/74
See application file for complete search history.

(56) References Cited

U.S. PATENT DOCUMENTS

| 5,572,565 A * | 11/1996 | Abdel-Mottaleb ... G06T 7/0012 378/37 |
| 5,825,910 A * | 10/1998 | Vafai .......................... G06T 7/12 382/132 |
| 8,300,908 B2 * | 10/2012 | Schneider ............. G06T 7/0012 382/128 |
| 9,311,717 B2 | 4/2016 | Serlie et al. |
| 10,621,779 B1 * | 4/2020 | Topiwala ................. G06N 5/00 |
| 2006/0029268 A1 * | 2/2006 | Endo ..................... G06T 11/008 382/132 |

(Continued)

FOREIGN PATENT DOCUMENTS

DE 102006021036 4/2010

OTHER PUBLICATIONS

Alhsnony, Farag H., Maher GM Abdolrasol, and Samei GM Abadelrsool. "Auto-identification of pectoral muscle region in digital mammogram images." International Journal of e-Education, e-Business, e-Management and e-Learning 4.1 (2014): 15. (Year: 2014 ).*

(Continued)

*Primary Examiner* — Avinash Yentrapati
(74) *Attorney, Agent, or Firm* — Dvir Gassner (57) ABSTRACT

A method comprising receiving a digital mammogram of a human breast; automatically extracting a contour boundary of said breast in said digital mammogram; automatically calculating a convex hull for said contour boundary; automatically comparing said contour boundary to said convex hull, to detect a plurality of gap segments, wherein each of said plurality of gap segments has an associated inflection point; and automatically determining a nipple location along said contour boundary as between a pair of said inflection points.

20 Claims, 9 Drawing Sheets

(56) References Cited

U.S. PATENT DOCUMENTS

| | | | | |
|---|---|---|---|---|
| 2006/0050944 A1* | 3/2006 | Takeo | ........................ | G06T 7/70 382/132 |
| 2006/0159321 A1* | 7/2006 | Takeo | ........................ | G06T 7/73 382/128 |
| 2011/0274327 A1* | 11/2011 | Wehnes | ................... | G06T 5/002 382/128 |
| 2015/0003702 A1* | 1/2015 | Serlie | ..................... | G06T 7/0012 382/128 |
| 2015/0023576 A1* | 1/2015 | Behiels | .................. | A61B 6/025 382/131 |

OTHER PUBLICATIONS

Chun-Chu Jen et al., "Automatic Nipple Detection in Mammograms Using Local Maximum Features Along Breast Contour", Biomedical Engineering: Applications, Basis and Communications, 2015, vol. 27, No. 4.

Indra Kanta Maitra et al., "Accurate Breast Contour Detection Algorithms in Digital Mammogram", Jul. 2011, International Journal of Computer Applications (0975-8887), vol. 25, No. 5.

Seung-Hoon Chae et al., "Fully automated nipple detection in digital breast tomosynthesis", Computer Methods and Programs in Biomedicine, May 2017, vol. 143, pp. 113-120.

Xiaoguang Pan et al., "A new idea for visualization of lesions distribution in mammogram based on CPD registration method", Technology and Health Care 25, 2017, pp. S459-S467.

S. K. Kinoshita et al., "Radon-Domain Detection of the Nipple and the Pectoral Muscle in Mammograms", Journal of Digital Imaging, Mar. 2008, vol. 21 , No. 1, pp. 37-49.

Mainak Jas et al., "A Heuristic Approach to Automated Nipple Detection in Digital Mammograms", Journal of Digital Imaging, Oct. 2013, vol. 26, Issue 5, pp. 932-940.

Mario Mustra et al., "Nipple Detection in Craniocaudal Digital Mammograms", 51st International Symposium ELMAR—2009, Sep. 28-30, 2009, pp. 15-18, Zadar, Croatia.

* cited by examiner

AUTOMATED NIPPLE DETECTION IN MAMMOGRAPHY

BACKGROUND

The invention relates to the field of automatic medical image analysis.

Breast cancer is a leading cause of cancer deaths among women. For women in the United States and other developed countries, it is the most frequently diagnosed cancer.

Mammography is a popular technique to identify breast cancer. It is considered the most effective and economical breast imaging modality due to its simplicity, portability and cost effectiveness.

Digital mammography, also called Full-Field Digital Mammography (FFDM), is a specialized form of mammography that uses digital receptors and computers instead of X-ray film to help examine breast tissue for breast cancer. The electronics of a digital mammography system convert the received X-rays to digital signals that can be read by a computer and presented on its screen, permitting more manipulation of images to allow radiologists to view the results more clearly.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment is directed to a method comprising: receiving a digital mammogram of a human breast; automatically extracting a contour boundary of said breast in said digital mammogram; automatically calculating a convex hull for said contour boundary; automatically comparing said contour boundary to said convex hull, to detect a plurality of gap segments, wherein each of said plurality of gap segments has an associated inflection point; and automatically determining a nipple location along said contour boundary as between a pair of said inflection points.

In some embodiments, the automatic determination of the nipple location is based, at least in part, on specified parameters of said gap segments associated with said pair of inflection points.

In some embodiments, each of said plurality of gap segments defines a segment of said contour boundary in which said convex hull does not track said contour boundary.

In some embodiments, said inflection points are each a point on said associated gap segment that is the farthest from said convex hull.

In some embodiments, the method further comprises identifying a pair of said plurality of gap segments as end gap segments, based on at least some of: a length of each of said end gap segments relative to a length of said contour boundary; a length of each of said end gap segments relative to a length of a line connecting each end of said contour boundary; a curvature of each of said end gap segments; and a height of each of said end gap segments.

In some embodiments, said comparing comprises comparing only an area of said contour boundary between said inflection points associated with said end gap segments.

In some embodiments, said specified parameters of said gap segments associated with said pair of inflection points are selected from the group consisting of: height, a curvature, a distance between said pair of inflection points, and a distance of said nipple location from a line connecting each end of said contour boundary.

Another embodiment is directed to a system comprising at least one hardware processor; and a non-transitory computer-readable storage medium having program code embodied therewith, the program code executable by said at least one hardware processor for performing any one of the above embodiments of the method.

In some embodiments, the system further comprises an X-ray imaging device configured to generate said digital mammogram.

A further embodiment is directed to a computer program product comprising a non-transitory computer-readable storage medium having program instructions embodied therewith, the program instructions executable by at least one hardware processor to perform any one of the above embodiments of the method.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein are a system, method, and computer program product for performing automated detection of a nipple in a mammogram, based on geometrical analysis of a contour of a breast. In some embodiments, breast contour analysis in accordance with the present invention may further provide for automated detection of anomalies such as skin thickening, skin convexity, and/or skin retraction. In some embodiments, the present invention may be configured for breast contour analysis in any form of mammography, including scanned mammograms, digital mammograms, digital breast tomosynthesis (DBT), and/or additional mammography techniques.

In mammography, nipple location in images acts as an invaluable landmark for aligning the right and left breasts, matching of different mammographic views (such as medio-lateral oblique (MLO) and cranio-caudal (CC) views), triangulation of lesions relative location, and skin analysis. Nipples may in some cases be invisible in a breast image, and therefore a nipple detection method must be able to detect the nipples even in the absence of human-discernable features.

Contour anomalies in breasts may be an indication of pathological tissue in the breast. For example, breast skin thickening can be the result of inflammatory breast cancer which forms in layers. Convex breast skin changes may be associated with an underlying mass (lipoma, large fibroadenoma, or cystosarcoma phyllodes). Breast skin retraction (i.e., concave changes of the skin of the breast) range from a small area of skin flattening in the vicinity of an underlying tumor or area of thickening, to shrinkage of most of the skin of the breast. They usually result from shortening of Cooper's ligaments due to fibrosis. Carcinoma is the most common cause and is usually associated with a distinct mass or very subtle underlying thickening in the breast tissue.

In some embodiments, a contour analysis algorithm of the present invention may be configured for first processing a mammogram image (or simply, a "mammogram") to extract a contour of a breast in the image. In some embodiments, based on the extracted contour of the breast, the algorithm may then apply one or more convex hull techniques to calculate a convex hull of the breast contour. In some embodiments, the algorithm may then identify one or more inflection points in the breast contour, based, at least in part, on a comparison between the extracted breast contour and the calculated convex hull. In some embodiments, based on the location of inflection points, the algorithm may determine a location of a nipple, and/or one or more breast contour anomalies, such as skin thickening, skin convexity and/or skin retraction.

A potential advantage of the present invention is, therefore, in that it provides for a simple, fast and fully automated process for the detection of a nipple and/or contour anomalies in mammograms, and thus may lead to improved diagnoses. Absent the present automated algorithm, detection of the nipple and the mentioned anomalies may be either impossible to perform by a human, or at the very least be an extremely tedious and inaccurate task.

Figure 1:
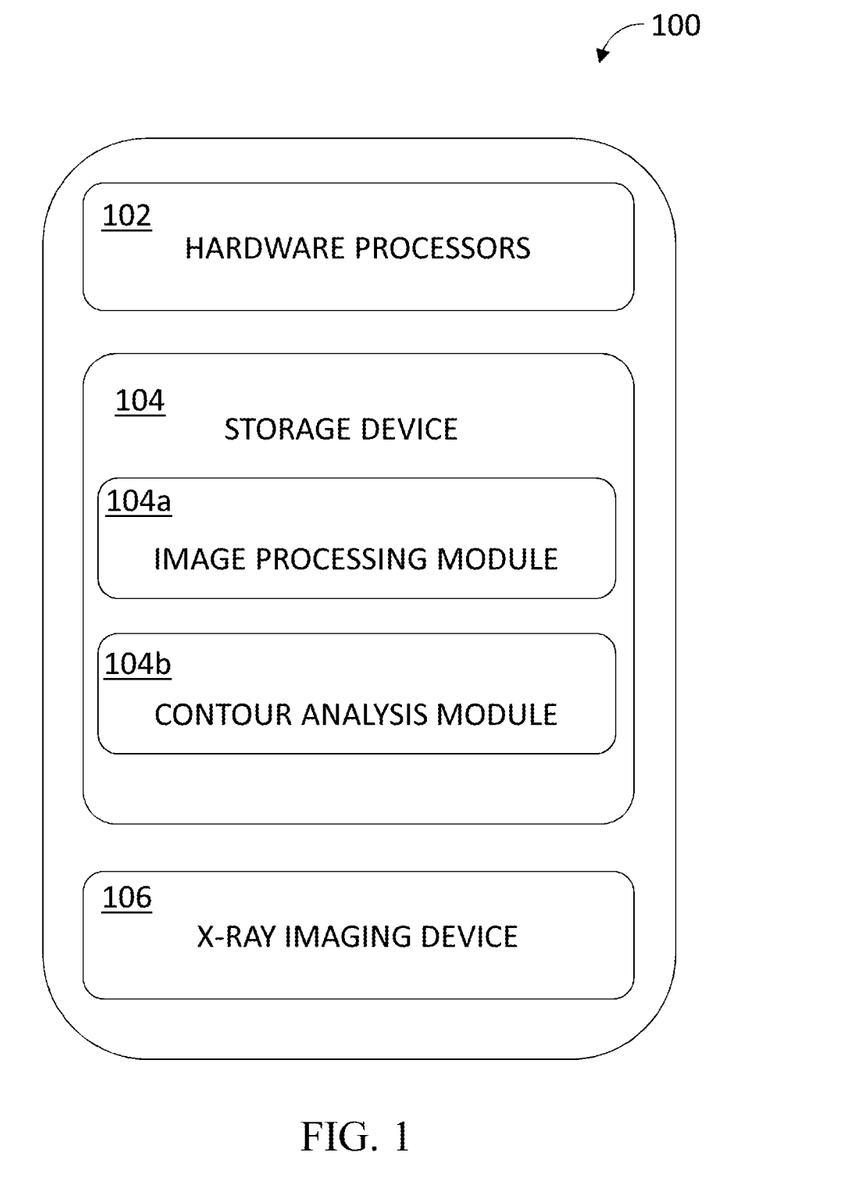
FIG. 1 is a block diagram of an exemplary system for automated acquisition of sentiment composition, according to an embodiment.

FIG. 1 is a block diagram of an exemplary system 100 for automated detection of nipple in a mammogram, according to an embodiment. System 100 may comprise one or more hardware processors 102 and a non-transitory computer-readable storage medium 104, comprising, e.g., an image processing module 104a and a contour analysis module 104b.

System 100 may further include an X-ray imaging device 106, such as a Computed Radiography (CR) device or a Digital Radiography (DR) device, as known in the art. In a CR device, a cassette with photo-stimulated luminescence screens captures the X-ray image, instead of a traditional X-ray film. The CR cassette is then manually inserted into a reader to convert the image data into a digital image that can be reviewed and processed. In a DR device, a flat panel detector (FPD) includes a detection layer deposited over an active matrix array of thin film transistors and photodiodes. The X-radiation is converted to digital data by the FPD in real-time and is available for review and processing almost instantaneously.

System 100 as described herein is only an exemplary embodiment of the present invention, and in practice may be implemented in hardware, software only, or a combination of both hardware and software. System 100 may have more or fewer components and modules than shown, may combine two or more of the components, or may have a different configuration or arrangement of the components. In various embodiments, system 100 may comprise one or more dedicated hardware devices, one or more software modules, and/or may form an addition to or extension to an existing device.

Storage medium 104 may have encoded thereon software instructions or components configured to operate a processing unit (also "hardware processor," "CPU," or simply "processor"), such as hardware processor(s) 102. In some embodiments, the software components may include an operating system, including various software components and/or drivers for controlling and managing general system tasks (e.g., memory management, storage device control, power management, etc.), and facilitating communication between various hardware and software components. In some embodiments, the program instructions are segmented into one or more software modules, which may comprise, e.g., image processing module 104a and contour analysis module 104b.

Figure 2:
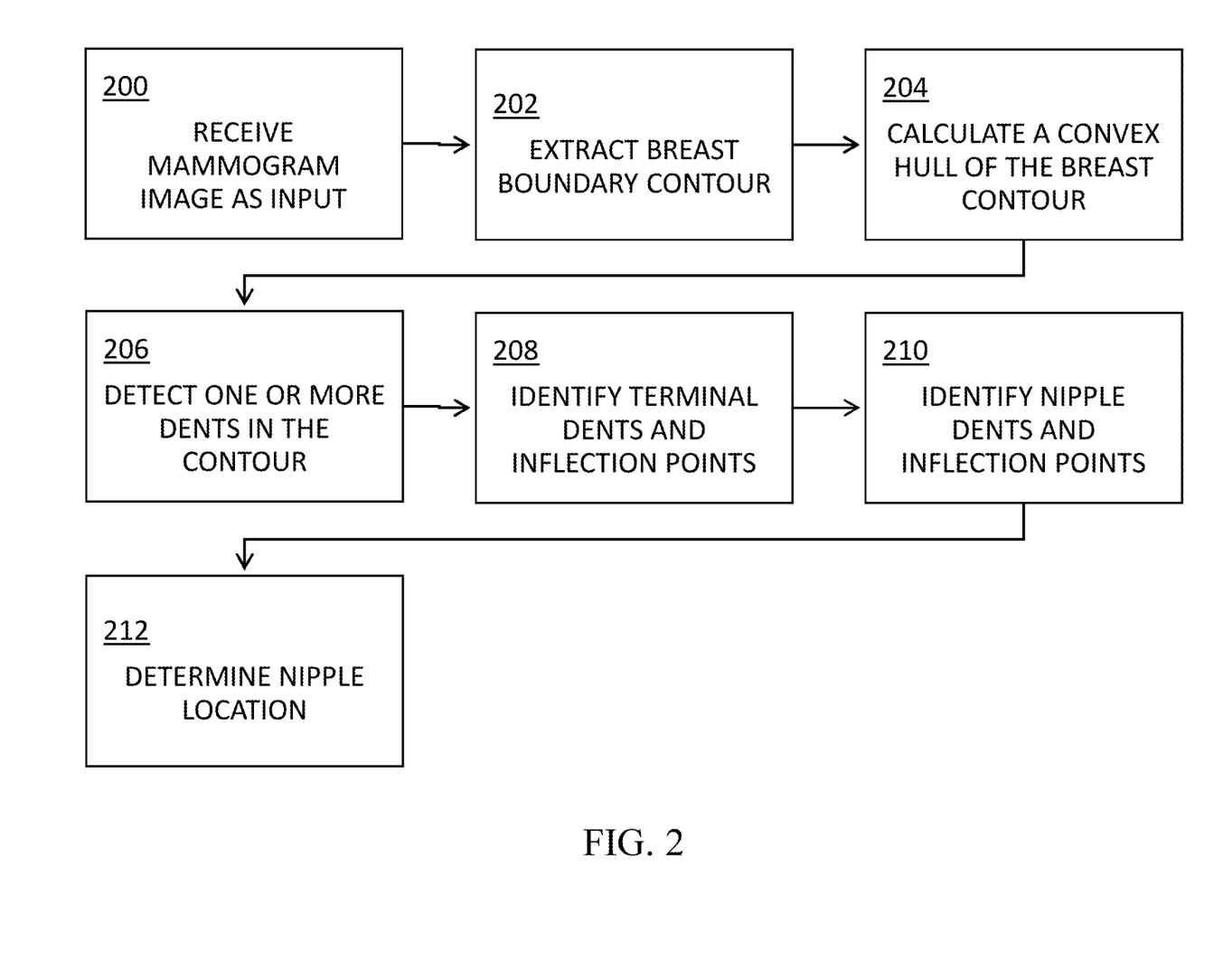
FIG. 2 is a flowchart illustrating the functional steps of a process for automated detection of a nipple in a mammogram, according to an embodiment.

An overview of the functional steps in a process for automated detection of nipple in mammography will now be provided with continual reference to FIG. 1 and the flowchart in FIG. 2.

In some embodiments, at a step 200, a mammogram may be received as input by a system of the present invention, such as by X-ray imaging device 106 of FIG. 1. Alternatively, a mammogram may be received from any other source and not directly from an X-ray imaging device; for example, the mammogram may be retrieved from a picture archiving and communication system (PACS) of a medical facility, or from any other type of digital data storage.

In some embodiments, at a step 202, image processing module 104a may be configured for applying one or more image processing techniques to extract a contour of the breast in the image, e.g., by detecting a boundary of the breast in the image. For example, image processing module 104a may apply the method described by Indra Kanta Maitra et al., "Accurate Breast Contour Detection Algorithms in Digital Mammogram", International Journal of Computer Applications (0975-8887) Volume 25-No. 5, July 2011.

Figure 3:
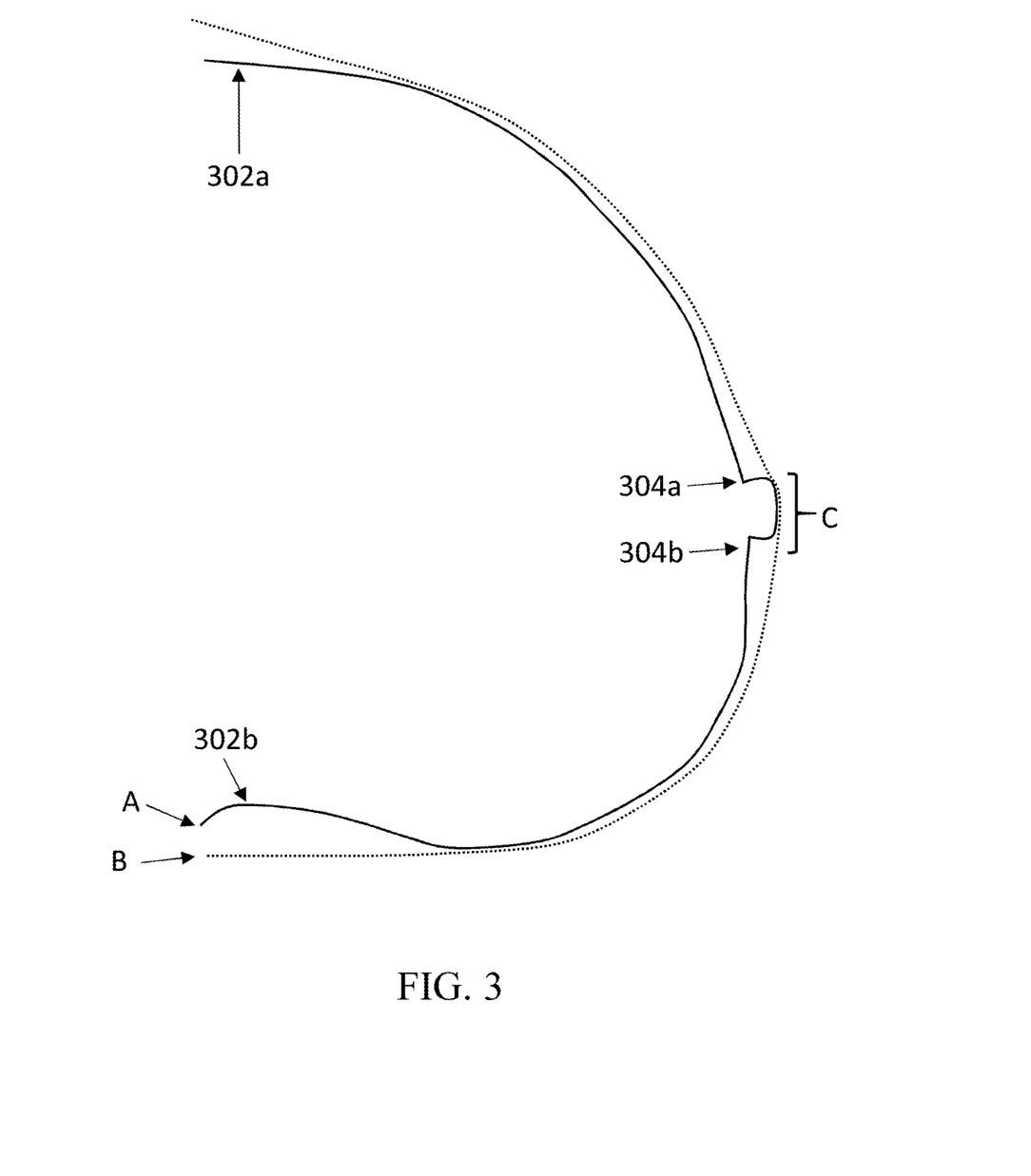
FIG. 3 is a side view of a breast image showing the breast boundary contour enclosed within a convex hull, according to an embodiment.

At a step 204, image processing module 104a may be configured for calculating a convex hull comprising the smallest convex polygon containing all the given points in the extracted contour, e.g., by applying one or more known convex hull algorithms. FIG. 3 is a side view of a breast image showing the breast boundary contour (A) enclosed within a convex hull (B).

At a step 206, contour analysis module 104b may be configured for performing a comparison between the breast contour and the convex hull, to identify one or more 'dents,' i.e., gaps areas or spaces where the convex hull has skipped over, e.g., a concave curve of the contour. For each such 'dent,' an inflection point may be defined as the point within the dent farthest from the convex hull, e.g., terminal inflection points 302a, 302b (where the breast meets the chest wall), and nipple inflection points 304a, 304b associated with a nipple region. In some embodiments, terminal inflection points 302a, 302b may define respective ends of a contour segment for further analysis.

At a step 208, in some embodiments, terminal inflection points such as 302a, 302b may be determined where an associated dent meets the following criteria: (i) overall dent length is large enough relative to overall contour length (e.g., at least 5% of total contour length, and at least 10% of the distance between the contour ends); (ii) maximum dent height of more than 3% of overall contour length; and (iii) maximum dent height above a specified threshold (e.g., 5 times the median of all dent heights in the contour, and more than the standard deviation of all dent heights).

At a step 210, in some embodiments, nipple inflection points such as 304a, 304b in FIG. 3 may be determined as potential bookends for nipple location. Such nipple inflection points must be within, e.g., the 10 largest dent heights within the contour and have an overall dent score calculated as:

$$score_{nipple} = \text{abs}(\text{curvature}) * d_0 * d_1 * distFromBase * \frac{height}{width},$$

where $d_0$ and $d_1$ are the heights of the two dents that bookend the nipple area, and the base is the line connecting the ends of the contour segment being analyzed. The nipple dents candidates with the highest score are selected as nipple area bookends.

At a step 212, a nipple (C in FIG. 3) may be defined as the contour region to be between the contour point farthest from the convex hull in each dent. most prominent local peak in the smoothed vector of the distances between the identified nipple inflection points (e.g., 304a, 304b).

Figure 4A:
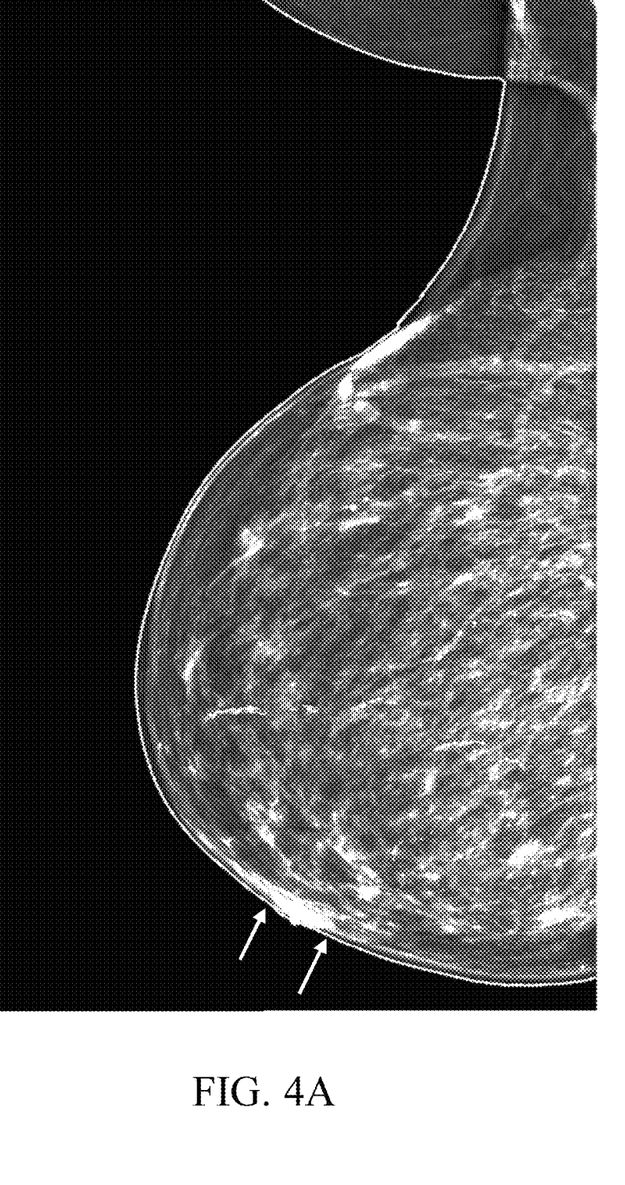
FIGS. 4A-4C show breast images in which two nipple inflection points identify a nipple region within the contour of the breast, according to an embodiment.
Figure 4B:
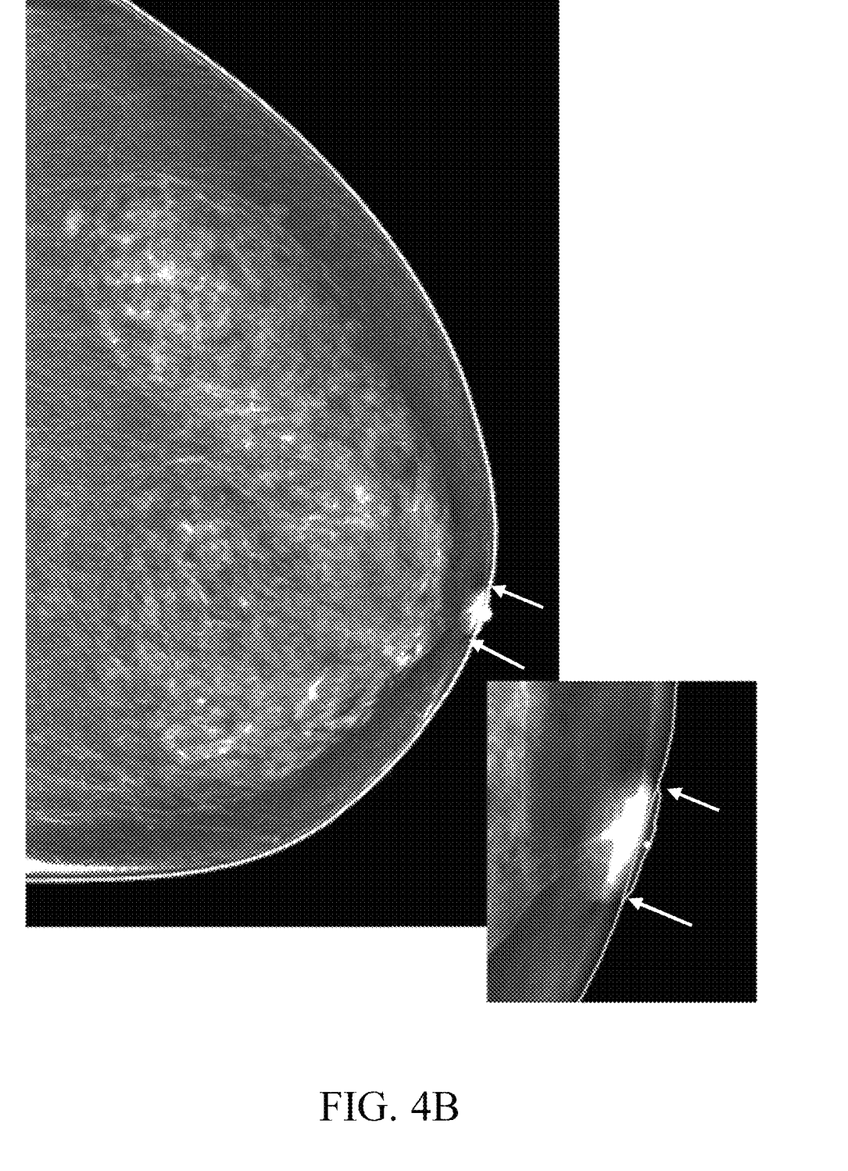
Figure 4C:
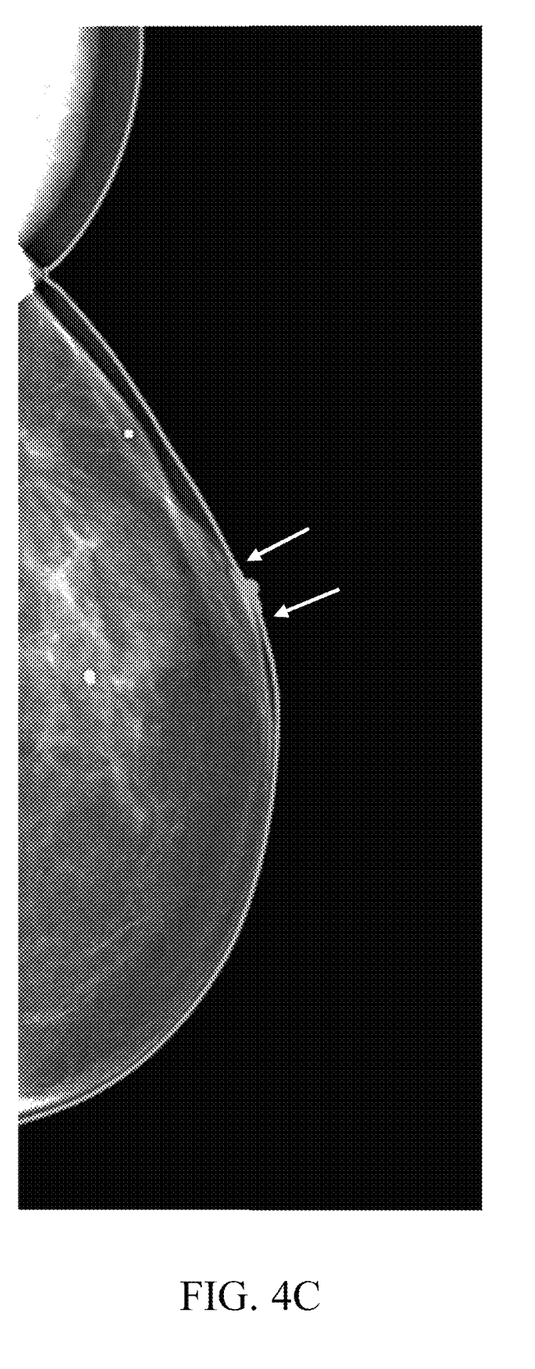

FIGS. 4A-4C show breast images in which two nipple inflection points (marked by two arrows) identify a nipple region within the contour of the breast.

Figure 5A:
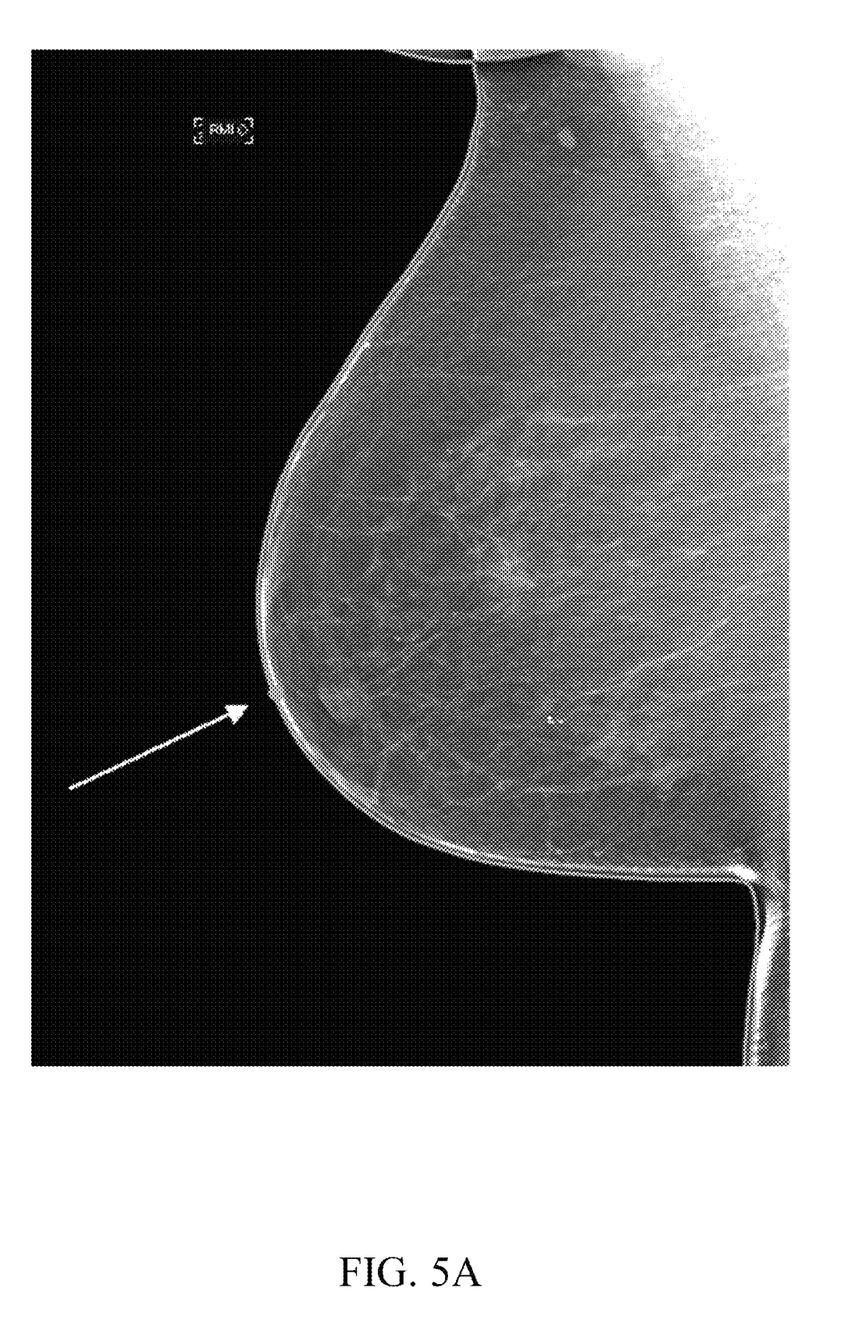
FIG. 5A-5C illustrate a process for identifying a nipple in a mammography image in the absence of detectable nipple inflection points, according to an embodiment.

In some embodiments, the present invention may be configured for identifying a nipple in a mammography image in the absence of detectable nipple inflection points in the image. In some cases, the nipples may not be prominent enough to create inflection points which will meet the criteria described above with reference to step 210 in FIG. 2. For example, the breast image in FIG. 5A does not contain suitable nipple inflection points which meet the above-described criteria. Accordingly, in some embodiments, the present invention may provide for alternative nipple detection process.

Figure 5B:
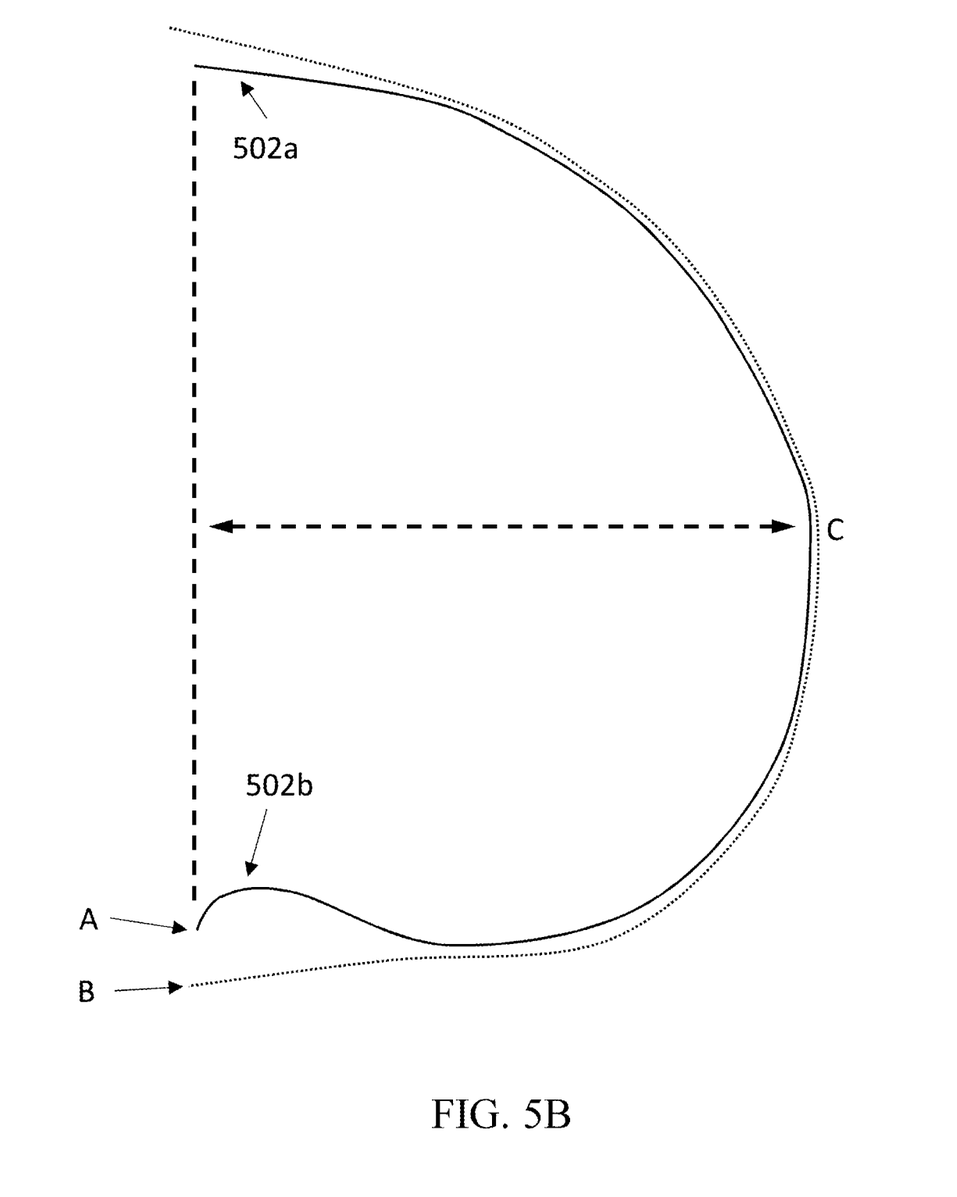

FIG. 5B illustrates a breast contour (A) enclosed in a convex hull (B) in a mammography image, wherein 502a, 502b represent terminal inflection points, but no suitable nipple inflection points may be found. In such cases, contour analysis module 104b may be configured for detecting a point (C) in the breast contour that is the farthest from a nominal line connecting the breast contour ends.

Figure 5C:
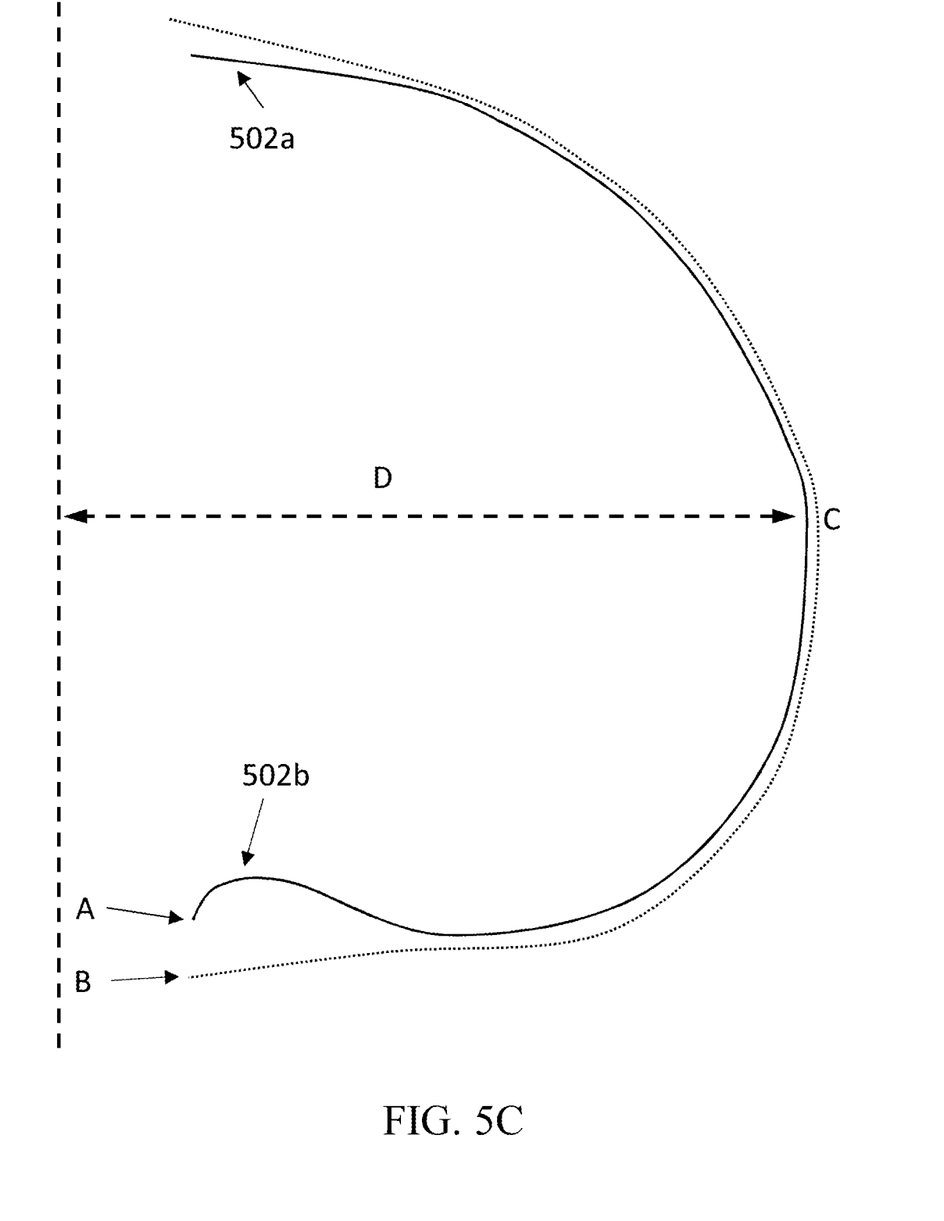

With reference to FIG. 5C, in some embodiments, contour analysis module 104b may be configured for detecting point (C) by identifying a border of the chest wall, and then calculating the vector D of distances between each point of the breast contour (A) and the chest wall line. Contour analysis module 104b may then be configured for smoothing vector D, e.g., using a low-pass filter, to obtain D'(d), and identify all local peaks in D' that are above 0.5*max D'). In the case that there are multiple local peaks, each such peak is scored according to its left and right slope, wherein the highest scoring peak may be selected as the nipple.

Experimental Results

The inventors have applied the present invention to a dataset comprising 1119 mammography images where nipple location has been marked manually.

When applied to that dataset, the disclosed algorithm detected a nipple in 1094 (~98%) images to within a distance of 20-30 pixels (equivalent to approximately 1.5-2 mm) from the manual marker. In only 22 (~2%) images the detected nipples were 20 mm or more from the manually-marked nipple.

These result demonstrate the efficacy and accuracy of the disclosed invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    at least one hardware processor; and
    a non-transitory computer-readable storage medium having program code embodied therewith, the program code executable by said at least one hardware processor for:
        receiving a digital mammogram of a human breast;
        automatically extracting a contour boundary of said breast in said digital mammogram;
        automatically calculating a convex hull for said contour boundary;
        automatically comparing said contour boundary to said convex hull, to detect a plurality of gap segments, wherein each of said plurality of gap segments has an associated inflection point; and
        automatically determining a nipple location along said contour boundary as between a pair of said inflection points.

2. The system of claim 1, wherein the automatic determination of the nipple location is based, at least in part, on specified parameters of said gap segments associated with said pair of inflection points.

3. The system of claim 2, wherein each of said plurality of gap segments defines a segment of said contour boundary in which said convex hull does not track said contour boundary.

4. The system of claim 2, wherein said inflection points are each a point on said associated gap segment that is the farthest from said convex hull.

5. The system of claim 2, further comprising identifying a pair of said plurality of gap segments as end gap segments, based on at least some of: a length of each of said end gap segments relative to a length of said contour boundary; a length of each of said end gap segments relative to a length of a line connecting each end of said contour boundary; a curvature of each of said end gap segments; and a height of each of said end gap segments.

6. The system of claim 5, wherein said comparing comprises comparing only an area of said contour boundary between said inflection points associated with said end gap segments.

7. The system of claim 2, wherein said specified parameters of said gap segments associated with said pair of inflection points are selected from the group consisting of: height, a curvature, a distance between said pair of inflection points, and a distance of said nipple location from a line connecting each end of said contour boundary.

8. The system of claim 1, further comprising an X-ray imaging device configured to generate said digital mammogram.

9. A method comprising:
    receiving a digital mammogram of a human breast;
    automatically extracting a contour boundary of said breast in said digital mammogram;
    automatically calculating a convex hull for said contour boundary;
    automatically comparing said contour boundary to said convex hull, to detect a plurality of gap segments, wherein each of said plurality of gap segments has an associated inflection point; and automatically determining a nipple location along said contour boundary as between a pair of said inflection points.

10. The method of claim 9, wherein the automatic determination of the nipple location is based, at least in part, on specified parameters of said gap segments associated with said pair of inflection points.

11. The method of claim 10, wherein each of said plurality of gap segments defines a segment of said contour boundary in which said convex hull does not track said contour boundary.

12. The method of claim 10, wherein said inflection points are each a point on said associated gap segment that is the farthest from said convex hull.

13. The method of claim 10, further comprising identifying a pair of said plurality of gap segments as end gap segments, based on at least some of: a length of each of said end gap segments relative to a length of said contour boundary; a length of each of said end gap segments relative to a length of a line connecting each end of said contour boundary; a curvature of each of said end gap segments; and a height of each of said end gap segments.

14. The method of claim 13, wherein said comparing comprises comparing only an area of said contour boundary between said inflection points associated with said end gap segments.

15. The method of claim 10, wherein said specified parameters of said gap segments associated with said pair of inflection points are selected from the group consisting of: height, a curvature, a distance between said pair of inflection points, and a distance of said nipple location from a line connecting each end of said contour boundary.

16. A computer program product comprising a non-transitory computer-readable storage medium having program instructions embodied therewith, the program instructions executable by at least one hardware processor to:

receive a digital mammogram of a human breast;

automatically extract a contour boundary of said breast in said digital mammogram;

automatically calculate a convex hull for said contour boundary;

automatically compare said contour boundary to said convex hull, to detect a plurality of gap segments, wherein each of said plurality of gap segments has an associated inflection point; and automatically determine a nipple location along said contour boundary as between a pair of said inflection points.

17. The computer program product of claim 16, wherein the automatic determination of the nipple location is based, at least in part, on specified parameters of said gap segments associated with said pair of inflection points.

18. The computer program product of claim 17, wherein each of said plurality of gap segments defines a segment of said contour boundary in which said convex hull does not track said contour boundary.

19. The computer program product of claim 17, wherein said inflection points are each a point on said associated gap segment that is the farthest from said convex hull.

20. The computer program product of claim 17, wherein the program instructions are further executable to identify a pair of said plurality of gap segments as end gap segments, based on at least some of: a length of each of said end gap segments relative to a length of said contour boundary; a length of each of said end gap segments relative to a length of a line connecting each end of said contour boundary; a curvature of each of said end gap segments; and a height of each of said end gap segments.

* * * * *